Patented Mar. 11, 1924.

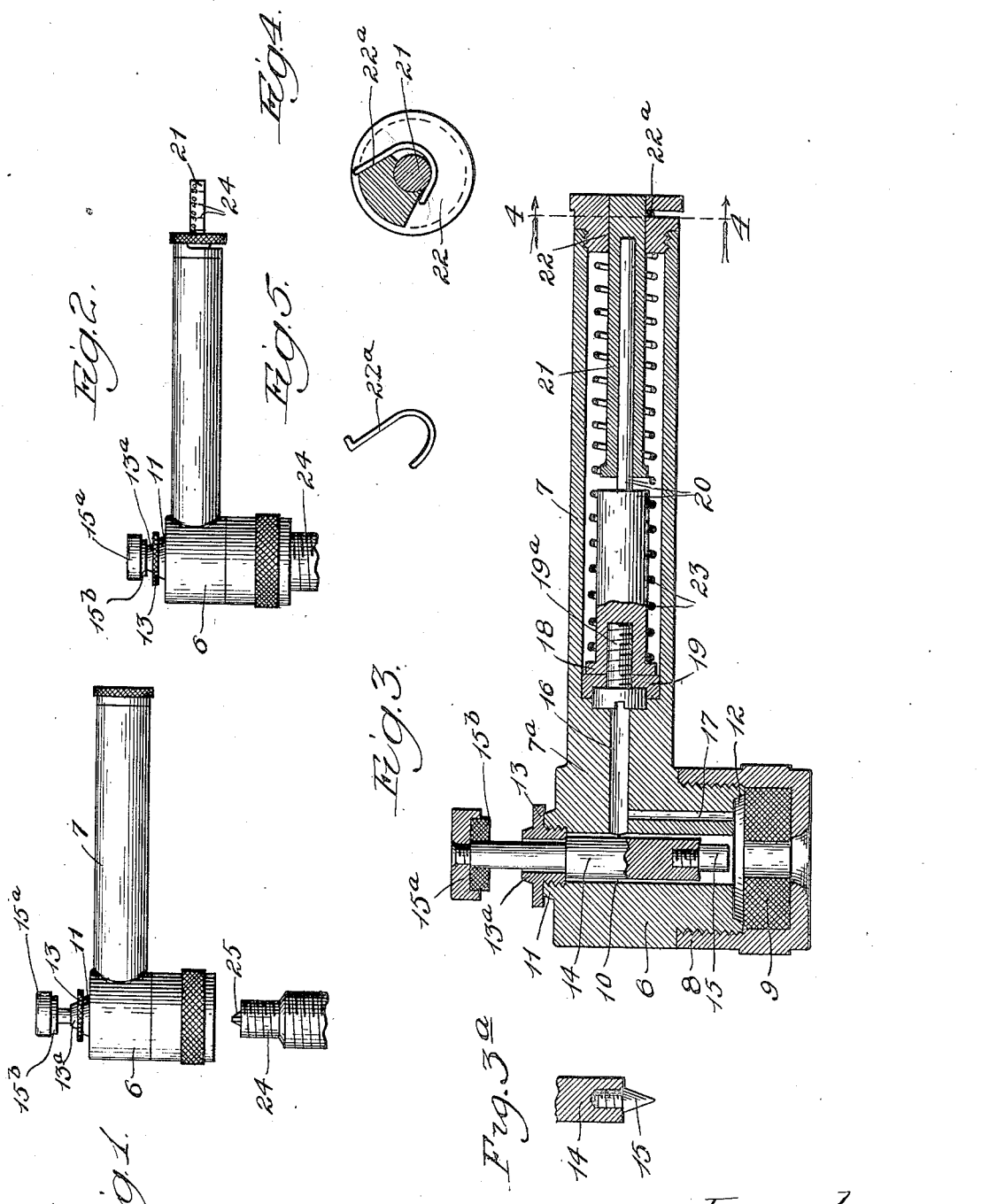

1,486,532

UNITED STATES PATENT OFFICE.

MICHAEL J. McANENY, OF DENVER, COLORADO.

PNEUMATIC-TIRE PRESSURE GAUGE.

Application filed October 18, 1922. Serial No. 595,335.

*To all whom it may concern:*

Be it known that I, MICHAEL J. MC-ANENY, a citizen of the United States, residing at Denver, in the county of Denver and State of Colorado, have invented a new and useful Improvement in Pneumatic-Tire Pressure Gauges, of which the following is a specification.

My invention is a device for ascertaining the amount of air-pressure in a pneumatic tire by applying it to the valved nipple on the latter; and it is fully described in the specification and illustrated in the accompanying drawing, in which—

Figure 1 shows the device by a view in side elevation with a valved tire-nipple represented, by a broken view, in position relative to the device for its application thereto;

Figure 2 is a similar view showing the device applied to the tire-nipple and the pressure-indicating bar protruded through the rear end of the tubular handle-forming cylinder of a spring-pressed piston;

Figure 3 is an enlarged longitudinal vertical section of the device;

Figure 3ª is a broken view in sectional elevation showing a modified form of the beak detail for opening the valve in a tire-nipple;

Figure 4 is a section on line 4—4, Fig. 3, and

Figure 5 is a perspective view of a spring detail.

A nozzle 6 extends from the neck 7ª of a tubular handle-forming cylinder 7. A knurled thimble 8 is screwed upon the nozzle to secure in place against its face a gasket 9 of rubber or other suitable material. A passage 10 extends centrally through the nozzle from its upper end, about which a seat 11 is formed, and the passage terminates in an air-chamber 12 formed in the face of the nozzle as an expansion of the passage 10 to extend over the gasket. A circumferentially flanged nut 13 screws into the outer end of the passage 10 with its flange bearing against the seat 11, and has a seat 13ª formed on its outer face about the nut-opening, through which works the stem of a plunger 14 loosely fitting the nozzle-passage and having screwed centrally into its end a projection or beak 15 of the blunt-ended shape illustrated in Fig. 3 or the pointed shape represented of the modification in Fig. 3ª. The plunger-stem carries on its outer end a button 15ª having a gasket 15ᵇ let into its under face to engage the seat 13ª and seal the outer end of the passage 10 when the plunger is depressed at the button.

An air-passage 16 is provided in the neck to connect the passage 10 with the cylinder 7 at its forward end; and a passage 17 connects the expanded or chambered end of the passage 10 with the passage 16.

The cylinder houses a piston having a gasket 19, of leather or other suitable material and fitting the bore of the cylinder, secured to the piston-head 18 by a headed screw 19ª, the stem 20 having its forward section of relatively-large diameter and its rear, narrower section extending into a hollow bar 21 closed at its outer end, working through a nut 22 which closes the rear end of the cylinder and carries a spring 22ª bearing against the adjacent end-portion of the bar 21 to apply friction thereto against its unduly loose or free movement through the nut 22. A helical spring 23 surrounds the larger section of the piston-stem and the bar 21, and is endwise confined between the nut 22 and the head 18.

The rear end of the bar 21 has a scale 24 marked on it, the uniform intervals being numbered, as 20, 30, 40 and 50, to indicate the air-pressure exerted upon the piston through the passage 16 against the resistance of the spring 23.

To use the device for ascertaining the degree of air-pressure within a pneumatic tire, the nozzle is applied to the valved tire-nipple 24. If the valve in the latter has a projecting tip 25, the blunt beak 15 shown in Fig. 3 is fixed in the lower end of the plunger 14; but it may be supplanted by the pointed beak 15 of Fig. 3ª when the tire-valve is devoid of such tip and contains a central recess or socket, both forms of the valve being well known and in common use. With the nozzle thus applied the operator, with his thumb on the button 15ª, depresses the plunger to seal the outer end of the passage 10 and engage the beak with the tire-valve to open it, whereupon air-pressure rushes from the tire by way of the nozzle and passages 17 and 16 against the piston to compress the spring 23 and protrude the gauge-bar beyond the rear end of the cylinder 7 to a distance, controlled by the spring, indicating the amount of inflating air-pressure contained in the tire. This operation informs the operator whether air-pressure is lacking in the tire and to what extent it may need to be replenished.

With the passage 10 sealed by the button 15ª being held by the operator against the seat 13ª, air-pressure in the chamber 12 will tend to compress the gasket 9 about the tire-nipple to cause it to hug the latter closely for preventing leakage from the tire. After using the device for its purpose the operator releases his thumb-pressure on the button and the air-pressure in the chamber 12 raises the plunger to its normal position, whereby that pressure may exhaust about the plunger to relieve the compression on the gasket and permit it to expand about the tire-nipple and thus enable the nozzle to be withdrawn therefrom without resistance, which unless removed would require such strain or wrenching to be exerted on the gasket as would tend to wear it and impair the functioning of the device, requiring the gasket to be replaced by a new one.

When the device is removed from a tire, the spring 23 recoils to return the piston to its seat and withdraw the bar 21 from its protruding position into its normal position within the cylinder, as represented in Fig. 3.

I realize that considerable variation is possible in the details of the construction herein shown and described, and I do not intend to limit myself thereto except as pointed out in the appended claims, in which it is my intention to claim all the novelty inherent in the device as broadly as is permitted by the state of the art.

I claim:

1. A device for ascertaining the amount of air-pressure in a pneumatic tire, comprising a hollow cylinder having a nozzle on its forward end and a closure on its rear end, there being a passage extending through the nozzle, a plunger in said passage provided with means for sealing the outer end of the passage by depressing the plunger, there being an air-passage connecting said plunger-containing passage with the cylinder and an air-passage in the nozzle connecting with each other said two first-named passages, a piston having a stem in said cylinder and spring-pressed to normally seat the piston against the adjacent end of the air-passage thereto, and a scale-bar in the cylinder, operatively engaged by said stem to move said bar to expose to view the pressure-indication thereon by air-pressure against the spring-resisted piston.

2. A device for ascertaining the amount of air-pressure in a pneumatic tire, comprising a hollow cylinder having a nozzle on its neck-end and a closure on its rear end, there being a passage extending through the nozzle and provided with a closing nut in its outer end, a plunger in said passage having a stem working through said nut and provided with a gasket-faced button seating against said nut, there being an air-passage in the neck connecting the plunger-containing passage with the cylinder and an air-passage in the nozzle connecting the plunger-containing passage with said neck-passage, a piston having a stem in said cylinder and spring-pressed to normally seat the piston against the adjacent end of said neck-passage thereto, and a hollow scale-bar in the cylinder having a closed rear end and into which said stem extends to protrude said bar through the rear-end closure of the cylinder by air-pressure against the spring-resisted piston.

3. A device for ascertaining the amount of air-pressure in a pneumatic tire, comprising a hollow cylinder having a closure on its rear end and on its neck-end a nozzle having a dished face, a gasket of yielding material confined against said face to form an air-chamber, there being a passage extending through said nozzle to said chamber, a beak-carrying plunger in said passage provided with means for sealing the outer end thereof by depressing the plunger, there being an air-passage in the neck connecting the plunger-containing passage with the cylinder and an air-passage leading from said chamber to said neck-passage, a piston having a stem in said cylinder and spring-pressed to normally close the piston against the adjacent end of said neck-passage, and a scale-bar in the casing operatively engaged by said stem to protrude said bar through the rear cylinder-end by air-pressure against the spring-resisted piston.

4. A device for ascertaining the amount of air-pressure in a pneumatic tire, comprising a hollow cylinder having a nut-closed rear end and a nozzle on its forward end containing a plunger-passage, a plunger in said passage provided with means for sealing the outer end thereof by depressing the plunger, there being an air-passage connecting the plunger-containing passage with the cylinder and an air-passage in the nozzle connecting with each other said two first-named passages, a piston having a stem in said cylinder and spring-pressed to normally seat the piston against the adjacent end of the air-passage thereto, a scale-bar in the cylinder operatively engaged by said stem to protrude said bar through said end-closing nut by air-pressure against the spring-resisted piston, and a spring on said nut bearing against said bar to frictionally resist its movement.

MICHAEL J. McANENY.